United States Patent
Nishikawa

(10) Patent No.: US 7,433,072 B2
(45) Date of Patent: Oct. 7, 2008

(54) PRINT CONTROLLER, PRINT CONTROL METHOD AND COMPUTER PROGRAM

(75) Inventor: Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 10/991,420

(22) Filed: Nov. 19, 2004

(65) Prior Publication Data
US 2005/0134917 A1 Jun. 23, 2005

(30) Foreign Application Priority Data
Nov. 28, 2003 (JP) .............................. 2003-400746

(51) Int. Cl.
*H04N 1/40* (2006.01)
(52) U.S. Cl. ..................... 358/1.18; 358/540; 382/180
(58) Field of Classification Search ....... 358/1.15–1.18, 358/540; 382/175, 177, 180, 282, 287, 306, 382/317
See application file for complete search history.

(56) References Cited

U.S. PATENT DOCUMENTS

| | | | | |
|---|---|---|---|---|
| 5,404,294 A * | 4/1995 | Karnik | ...................... | 715/507 |
| 2002/0026543 A1 | 2/2002 | Mori et al. | ............... | 707/104.1 |
| 2002/0052897 A1 | 5/2002 | Nishikawa et al. | .......... | 707/527 |
| 2002/0067508 A1 | 6/2002 | Nishikawa et al. | ......... | 358/1.18 |
| 2002/0117794 A1 * | 8/2002 | Stevens et al. | ................. | 270/32 |
| 2002/0131086 A1 | 9/2002 | Mori et al. | .................. | 358/1.18 |
| 2003/0142337 A1 | 7/2003 | Kizaki et al. | ................ | 358/1.13 |
| 2003/0159114 A1 | 8/2003 | Nishikawa et al. | ........... | 715/530 |
| 2003/0160977 A1 | 8/2003 | Nishikawa et al. | ............ | 358/1.2 |
| 2005/0134917 A1 * | 6/2005 | Nishikawa | ................. | 358/1.18 |
| 2006/0268303 A1 * | 11/2006 | Yamada | ..................... | 358/1.12 |

OTHER PUBLICATIONS

U.S. Appl. No. 09/465,387, filed Dec. 17, 1999.
U.S. Appl. No. 09/703,684, filed Nov. 2, 2000.
U.S. Appl. No. 09/703,687, filed Nov. 2, 2000.
U.S. Appl. No. 09/703,692, filed Nov. 2, 2000.
U.S. Appl. No. 09/863,462, filed May 24, 2001.

* cited by examiner

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

A print controller for making a print device print in such a manner that a grouping for each record included in printed matter can be easily recognized is provided. A print control program stored on computer readable storage media for outputting a business form by sending output form data to a print device includes the steps of inputting form data which indicates a layout of the business form; inputting variable length field data consisting of a plurality of records; setting a print condition for each record included in the input field data; generating output form data of the business form by overlaying the field data set with the print condition on the input form data; and outputting the business form by sending the generated output form data to the print device.

12 Claims, 8 Drawing Sheets

- BASIC I/O PROGRAM — 41
- OS — 42
- CONTROL PROGRAM — 43
- DATA AREA M1 — 44
- WORK AREA — 45
- W1
- W2

FIG. 5

TABLE OF QUANTITIES

| ITEM | UNIT PRICE | QUANTITY |
|---|---|---|
| A | 100 | 2 |
| B | 200 | 3 |

FIG. 6A

TABLE OF QUANTITIES

| ITEM | UNIT PRICE | QUANTITY |
|---|---|---|
| A | 100 | 2 |
| B | 200 | 3 |

FIG. 6B

| C | 200 | 7 |
|---|---|---|
| D | 100 | 2 |
| E | 250 | 3 |

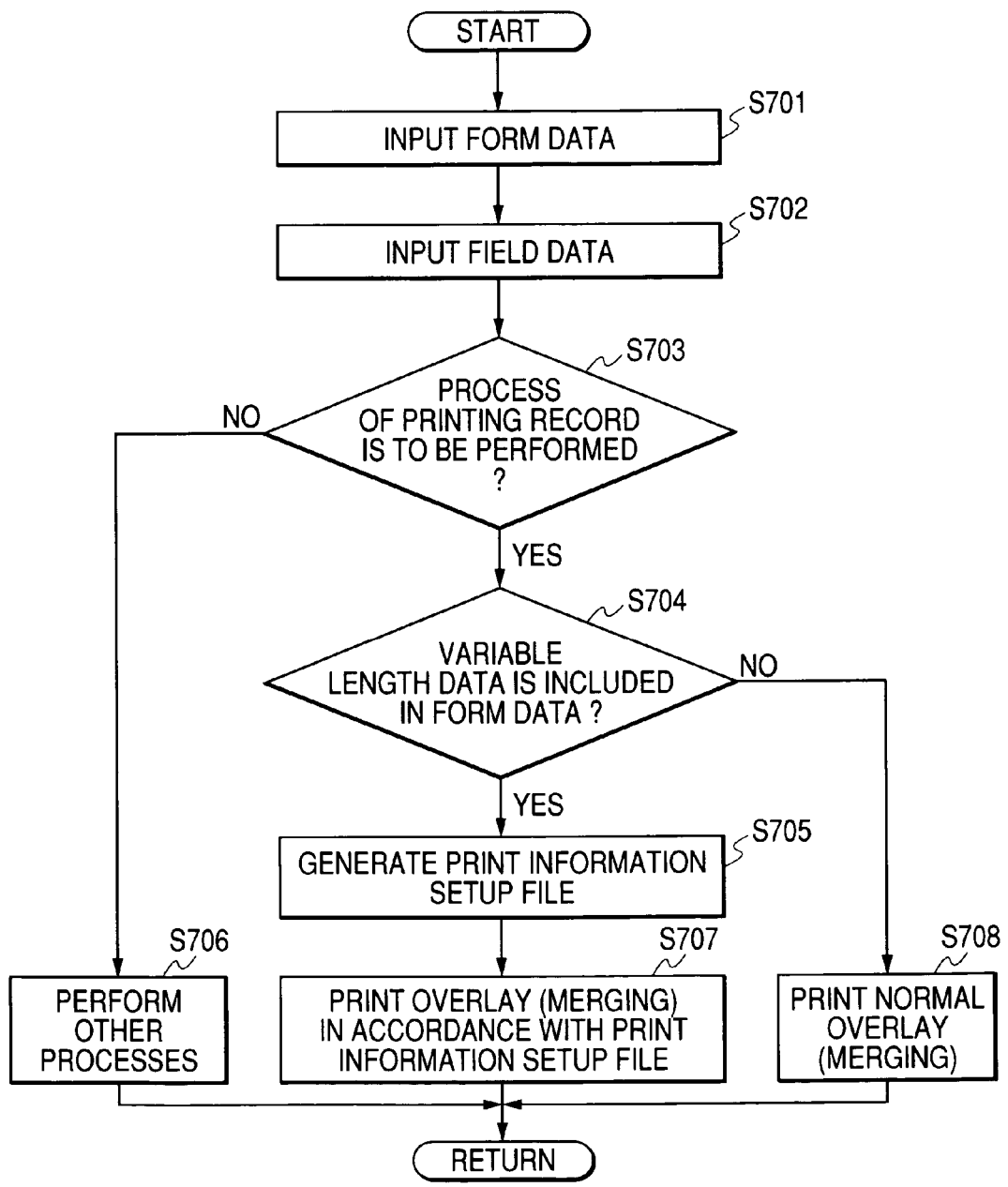

| 1ST PAGE | STAPLE OFF |
| 2ND PAGE | STAPLE KEEP |
| 3RD PAGE | STAPLE ON |
| 4TH PAGE | STAPLE KEEP |
| 5TH PAGE | STAPLE OFF |

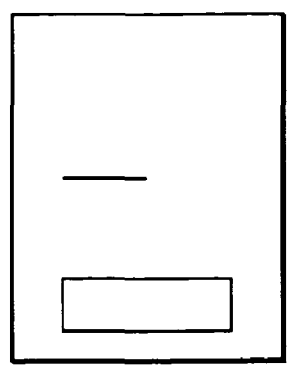
FIG. 11A  1ST RECORD
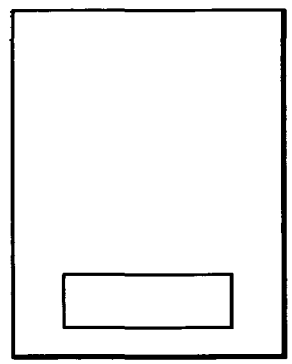
FIG. 11B  2ND RECORD
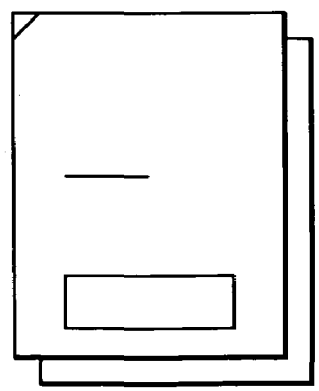
FIG. 11C  3RD RECORD (WITH STAPLE)
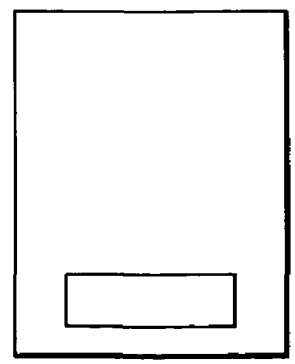
FIG. 11D  4TH RECORD

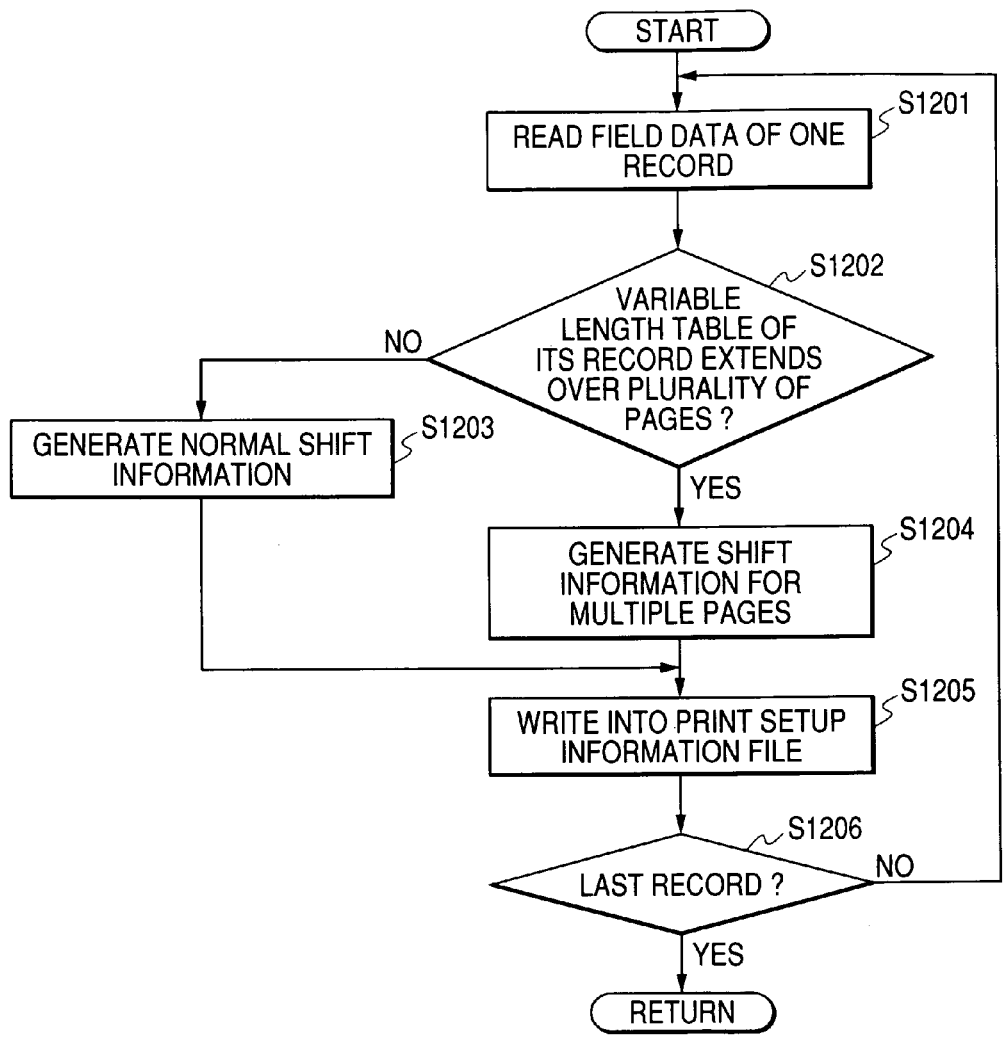

PRINT CONTROLLER, PRINT CONTROL METHOD AND COMPUTER PROGRAM

BACKGROUND OF THE INVENTION

1. Field of the Invention

The present invention relates to a print controller, a print control method and a computer program, and more specifically to a print controller, a print control method and a computer program for controlling printing of a business form by a print device.

2. Related Background Art

Conventionally, in outputting a business form by sending form data from a host device such as a personal computer to a printer, a user program utilizing a special library is executed in the host device. As shown in FIG. 4, the special library generates a final output form by loading data included in a data file into a predetermined place (field) of a form file (business form template) which indicates a layout of the business form. In the present specification, a diagram indicating the field into which data is loaded is referred to as a field diagram, and the data file loaded therein is referred to as field data.

A print setup for a printer is performed by a user through a user interface (UI) which is provided by the user program mentioned above, or performed by utilizing a specific print environment file which is previously saved.

In Japanese Patent Application Laid-Open No. 2001-277640, a business form print controller for controlling a print setup for each print job is also disclosed.

In the case of the business form printing mentioned above, variable length data may be loaded into a field defined in a record. In the example shown in FIG. 4, although each billing data item corresponds to a unit of the record, variable length table data may be loaded into the field diagram, and therefore the number of billing sheets changes depending on its length.

In the conventional print setup method, however, only the same print setup can be performed for the printing of all the records, and if a plurality of records are printed, all of the records are output according to the same print setup. Therefore, printed matter printed in such a manner has had a problem in that it is difficult to recognize a grouping (separation) for each record included therein.

SUMMARY OF THE INVENTION

The present invention is made considering such a problem, and an object of the invention is to provide a print controller, a print control method and a computer program for making a print device perform printing in which a grouping for each record included in printed matter can be easily recognized.

In order to achieve such an object, the invention according to claim 1 is characterized by a print controller comprising: form data input means for inputting form data which indicates a layout of a business form; field data input means for inputting variable length field data consisting of a plurality of records; setup means for setting a print condition for each record included in the field data input by the field data input means; generation means for generating output form data of the business form by overlaying the field data set with the print condition on the form data input by the form data input means; and control means for outputting the business form by sending the output form data generated by the generation means to a print device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing a business form which includes a variable length table in accordance with an embodiment of the present invention;

FIGS. 6A and 6B are diagrams showing a business form which includes a variable length table in accordance with an embodiment of the present invention;

FIG. 7 is a flow chart showing processes of a print control method in accordance with an embodiment of the present invention;

FIGS. 11A, 11B, 11C and 11D are diagrams showing an output result in accordance with an embodiment of the present invention;

FIG. 12 is a flow chart showing processes of a print control method in accordance with an embodiment of the present invention; and FIG. 13 is an image diagram of shift information included in a print information setup file in accordance with an embodiment of the present invention.

DETAILED DESCRIPTION OF THE PREFERRED EMBODIMENTS

Preferred embodiments of the present invention will be described in detail below with reference to the drawings.

First Embodiment

Figure 1:
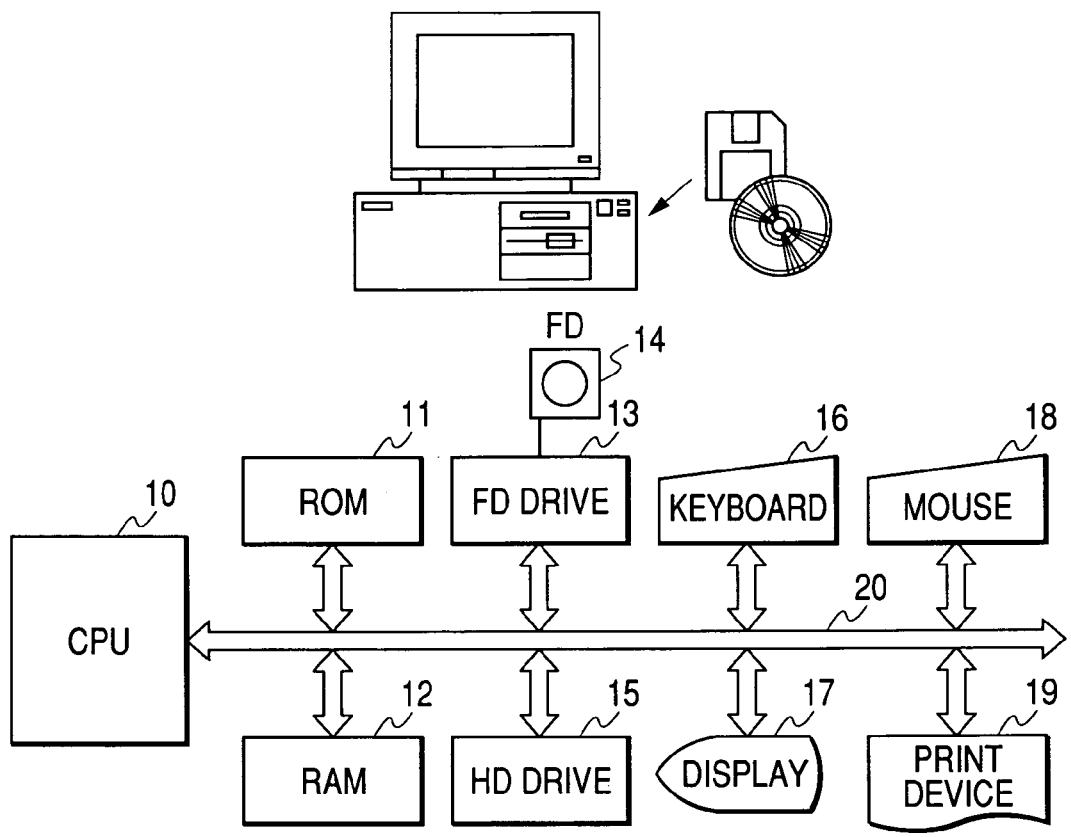
FIG. 1 is a diagram showing a hardware configuration of a business form printing system in accordance with an embodiment of the present invention.

FIG. 1 is a block diagram showing a hardware configuration of a business form printing system in accordance with the embodiment. This system is supposed to be a computer system comprising a central processing unit such as CPU 10, a main memory consisting of ROM 11/RAM 12, etc., an external storage device consisting of an FD drive 13, an HD drive 15, etc., a pointing input device consisting of a pointing device (coordinate indication means) such as a mouse 18, and a keyboard 16, a display device such as a CRT display 17, a print device 19 consisting of a printer or a plotter, and a system bus 20 to which each of these components is connected to enable communication. In addition, this business form printing system is supposed to be connected to other computer systems via communication lines such as a network.

This system operates based on a basic input/output (I/O) program, an operating system (OS), and a business form print program being executed by the CPU. It is supposed that the basic I/O program has been written in the ROM 11, and that the OS has been written in an HD in the HD drive 15. Therefore, when the power supply of the system is turned on, the OS is read into the RAM 12 from the HD based on the initial program loading (IPL) function in the basic I/O program, and the OS operation is started.

Figure 2:
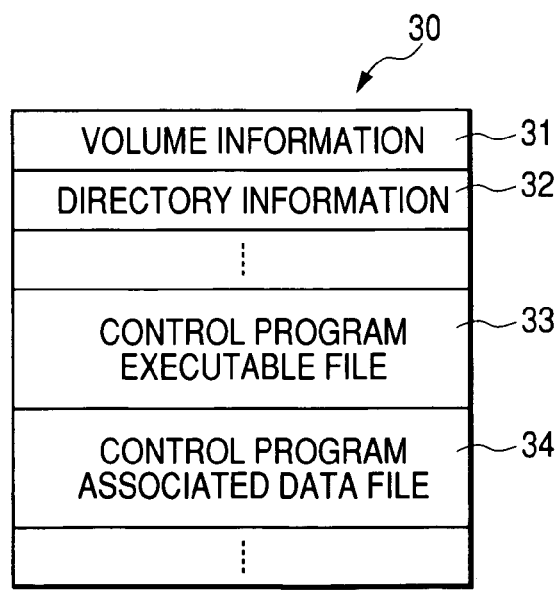
FIG. 2 is a diagram showing a configuration of content recorded in an FD in accordance with an embodiment of the present invention.

Further, a control program (business form print program) and its associated data for realizing the embodiment have been recorded in the FD 14, and a configuration of content recorded therein is shown in FIG. 2. In this figure, an FD 30 includes volume information 31, directory information 32, a control program executable file 33, and a control program associated data file 34.

The control program and the associated data recorded in FD 14 can be loaded into the computer system through the FD drive 13 as shown in FIG. 1. When the FD is set to the FD drive 13, the control program and the associated data are read from the FD 14 under the control of the OS and the basic I/O program, loaded into the RAM 12, and thereby made to be operable.

Figure 3:
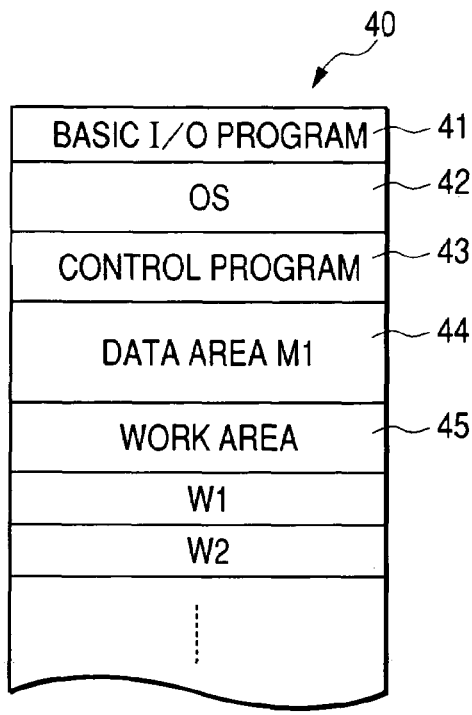
FIG. 3 is a diagram showing a memory map in an executable state after a control program in accordance with an embodiment of the present invention is loaded into a RAM.

FIG. 3 shows a memory map in an executable state after the control program is loaded into a RAM. As shown in this figure, the RAM 40 includes a basic I/O program 41, an OS 42, the control program 43, a data area 44 which stores a control program associated data file, etc., and a work area 45 used for computing processes.

Although, in this embodiment, an example in which the control program and the associated data are directly loaded into the RAM 12 from the FD 14 and executed is shown, the control program and the associated data may have been previously stored (installed) in the hard disk within the HD drive 15, and may be loaded into the RAM 12 from the HD during the operation of this program. Further, regarding the media for storing the control program, other removable storage media such as a CD-ROM and an IC memory card other than the FD may be utilized. Furthermore, by previously recording the program in the ROM 11 which is configured to be a part of the memory map, the program can be directly executed by the CPU 10. Furthermore, the control program may be read from other devices through the network and executed.

The embodiment of the present invention will now be described with reference to FIG. 5 to FIGS. 11A, 11B, 11C and 11D.

Figure 4:
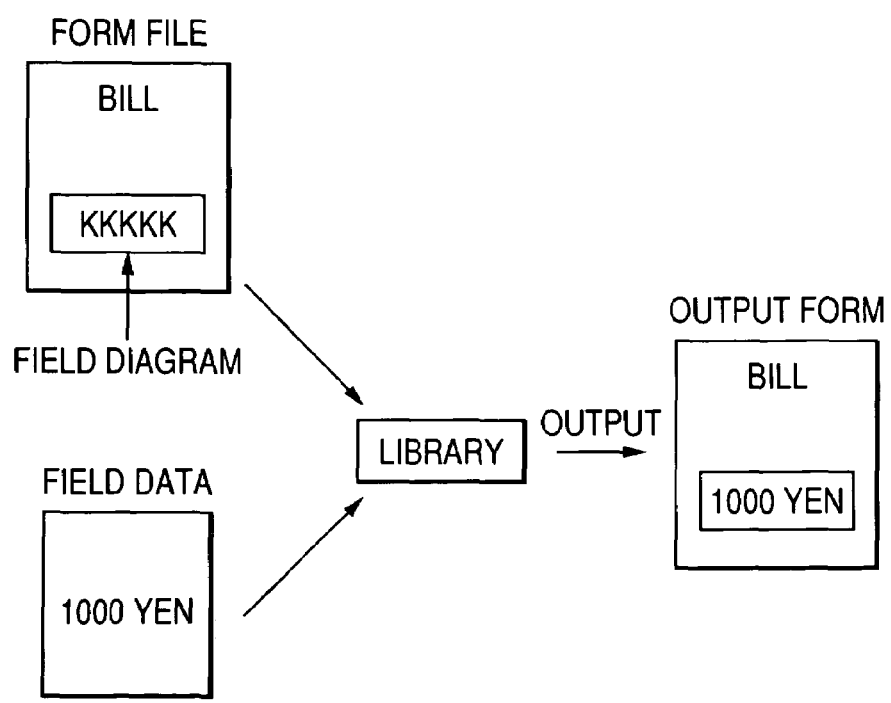
FIG. 4 is a conceptual diagram showing a generating method of an output form in accordance with an embodiment of the present invention.

As described above, in the printing of a business form, the control program utilizing the special library loads data of a data file into a predetermined place (field) of a form file (business form template) which indicates a layout of the business form to obtain a final output form as shown in FIG. 4.

A case will now be considered where a business form in which a variable length table as shown in FIGS. 5, 6A and 6B is included is to be printed. Here, the variable length table refers to such a table whose length changes depending on the field data as shown in FIGS. 5, 6A and 6B. In the example shown in FIGS. 6A and 6B, the final output form extends over a plurality of pages because of the existence of the variable length table.

Procedures of a print control method performed by the business form printing system in accordance with the embodiment will now be described with reference to the flow chart shown in FIG. 7.

First, a process of inputting form data which indicates a layout of the business form is performed (S701). This is the process to input a form file containing a field diagram as shown in FIG. 4. This process of inputting can be achieved by displaying a user interface (UI) on the business form printing system based on the execution of a user program, and by allowing a user to select an arbitrary form. Of course, the form data used in the user program may be fixed.

Next, a process of inputting variable length field data consisting of a plurality of records is performed (S702). This is the process to input data which is to be output by the user to the form file selected at step S701 as shown in FIG. 4. This field data is created from the data which is managed by a database program or a spread sheet program on the business form printing system used by the user, and the number of records included therein is arbitrary. This process of inputting can be achieved by receiving user's designation of field data on the UI displayed on the business form printing system based on the execution of the user program, and by reading the field data corresponding to the designation.

A determination is then made whether a process of printing the record is to be performed (S703). If the user wishes to print, then he or she gives a print instruction on the UI in the user program. Here, it is determined whether the instruction is made.

If the user's print instruction is not received, other processes will be performed (S706). If the instruction is received as determined at step S703, in order to perform printing, a determination is then made whether a variable length table is included in the form data by analyzing the form data (S704). This means that a determination will be made whether the printing is to be performed under print conditions described in a print information setup file discussed below. If there is no variable length table as determined at the step, then a process of normal overlay (merging) printing will be performed (S708).

If there is a variable length table as determined at step S704, then the next process of generating a print information setup file will be performed (S705). The print information setup file refers to the file in which a setup for the subsequent printing is stored. If the print information setup file is generated, then the next process of overlay (merging) printing in accordance with the print information setup file will be performed (S707).

Figure 8:
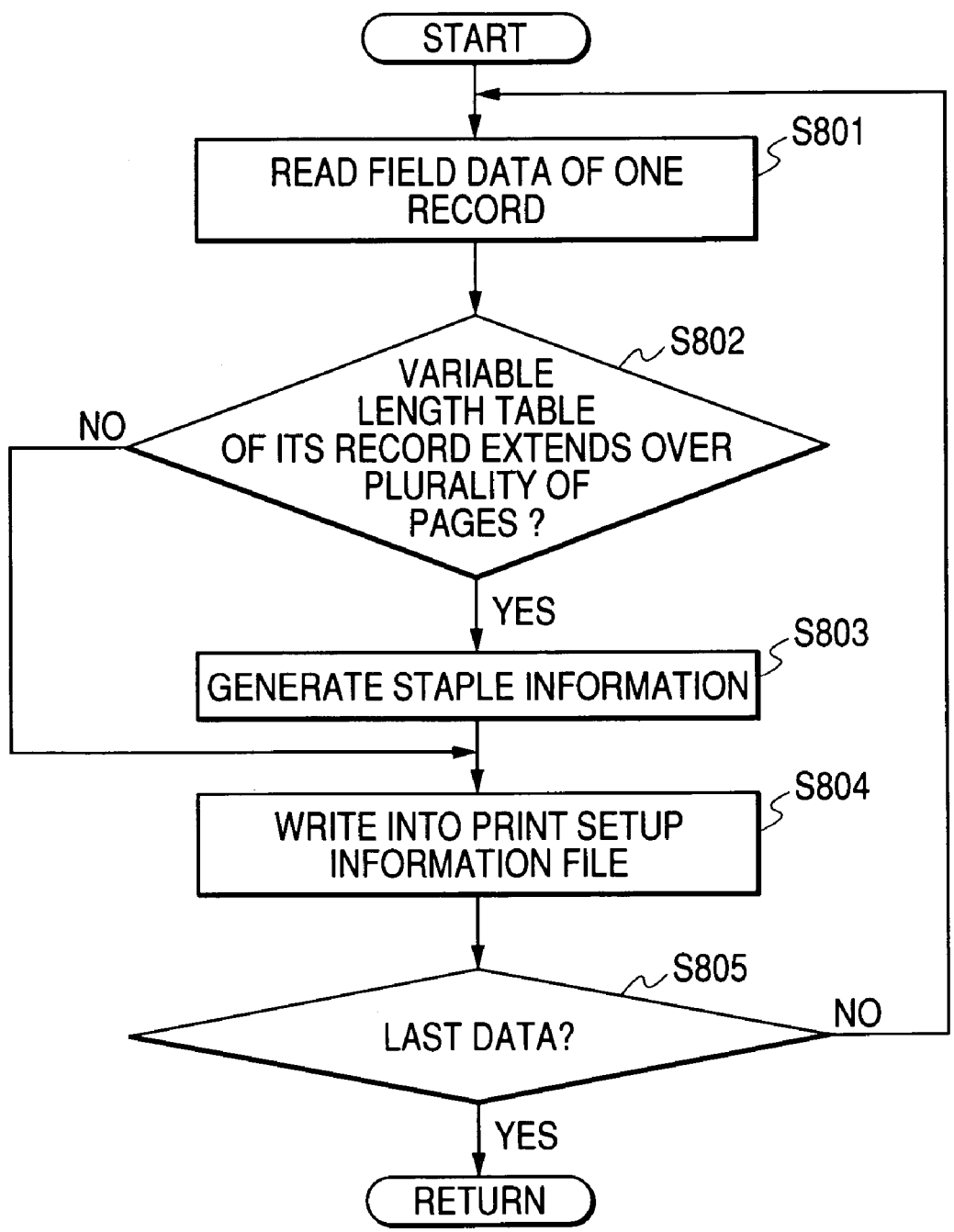
FIG. 8 is a flow chart showing processes of a print control method in accordance with an embodiment of the present invention.

The processes of generating the print information setup file will now be described with reference to a flow chart shown in FIG. 8.

First, a process of reading field data included in one record is performed (S801). This is the process to read the field data of one record which data is input in the process of inputting field data (S702). The print page(s) of one record is obtained by combining the read field data of one record with a form. A determination is then made whether a variable length table in the record extends over a plurality of pages (S802). In the case of the field data as shown in FIG. 5, the table is included within its page, but in the case of the field data as shown in FIGS. 6A and 6B, the table cannot be included within the page, and extends over the next page.

Considering now the case as shown in FIGS. 6A and 6B, the variable length table in the record is supposed to extend over a plurality of pages as determined at the step. The next process of generating staple information is then performed (S803). This is the process to generate staple information defining which page range is to be stapled for each page range in the entire print job in order to staple pages together in the case of print data mentioned above. A process of writing the staple information into a print setup information file is then performed (S804).

A process of determining whether the read record is the last record is then performed (step S805), and if it is not the last record, then the same processes which start from the process of reading field data of one record (S801) will be repeated. Therefore, the analyses are made for all the records, and the print information setup file is generated.

Figures 9, 10:
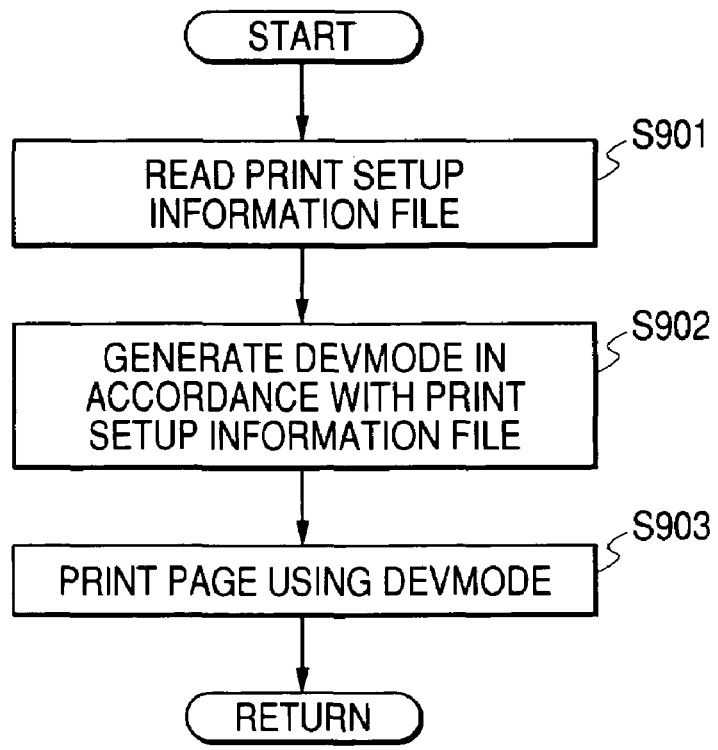
FIG. 9 is an image diagram of staple information included in a print information setup file in accordance with an embodiment of the present invention.
FIG. 10 is a flow chart illustrating processes of a print control method in accordance with an embodiment of the present invention.

FIG. 9 illustrates staple information which is written into the print setup information file. As shown in this figure, the staple information defines "staple on" or "staple off" for each page. Here, "staple keep" means that a page is still to be printed in the same state as the previous page. This example shows that in the case of field data for the first, second or fourth record the business form is printed as shown in FIG. 5, and that in the case of field data for the third record the business form is printed over a plurality of pages as shown in FIGS. 6A and 6B.

In such a manner as described above, a process of stapling is achieved for the record which is to extend over a plurality of pages as determined.

The detail of the process of overlay (merging) printing at step S707 will now be described with reference to FIG. 10.

First, a process of reading a print setup information file is performed (S901). This is the process to read the print setup information file generated in the process of generating the print information setup file (S705).

Here, a print setup information file including staple information as illustrated in FIG. 9 is read, and a process of generating a DEVMODE in accordance with the print setup information file is performed (S902). The DEVMODE is a structure which defines a print setup in printing based on Windows (R) as one of Microsoft operating systems (OS). An extended region is prepared for the DEVMODE, and a particular setup can be performed. A staple setup for each page is performed in accordance with designation of a printer driver.

A process of printing pages is then performed using the DEVMODE (S903). This is the process to perform printing for each page using the DEVMODE previously generated. The content which is set is sent to a printer (print device) through the printer driver, and therefore the "staple on" or "staple off" can be set for each page.

As mentioned above, the print condition is set for each record included in the field data, and the output form data of the business form is generated by overlaying the field data set with the print condition onto the form data, and the process of outputting the business form is achieved by sending the output form data to the print device.

FIGS. 11A to 11D show examples of the business form which is output based on the information shown in FIG. 9. The first, second, and fourth records of the business form are output for each sheet of paper as shown in FIGS. 11A, 11B, and 11D, while stapling two sheets of paper for the third record together is performed as shown in FIG. 11C.

In the printing of the business form containing any variable length page, the sequence of operations allows the staple setup to be performed only for the record which will extend over a plurality of pages.

Second Embodiment

As a second embodiment of the present invention, it is contemplated that a shift setup is performed in a print device while taking into account the record which will extend over a plurality of pages in the printing of the business form which includes a variable length page. The shift setup is the setup in which output results pooled at a paper exit are output while alternately shifting the output position for each record. Such an embodiment will be described in detail below with reference to FIG. 12 and others. Since the configuration of a business form printing system in accordance with this embodiment is substantially same as that of the first embodiment mentioned above, only the different points will be described.

The process of generating the print information setup file (S705) is performed based on the similar sequence to that of FIG. 7 shown for the first embodiment. The detail of the internal processes is shown in FIG. 12.

First, a process of reading field data of one record is performed (S1201). This is the process to read the field data of one record which data is input in the process of inputting field data (S702). The print page(s) of one record is obtained by combining the read field data of one record with a form. A process of determining whether a variable length table in the record extends over a plurality of pages is then performed (S1202).

In the case of the field data for printing the business form as shown in FIG. 5, the table is included within a single page, but in the case of the field data for printing the business form as shown in FIGS. 6A and 6B, the table cannot be included within the page, and extends over the next page. Considering now the case as shown in FIGS. 6A and 6B in the same manner as the first embodiment, the variable length table in the record is supposed to extend over a plurality of pages as determined at the step.

The next process of generating shift information for a plurality of pages is then performed (S1204). Here, the shift information for designating which page range is to be shifted or not to be shifted for each page range in the entire print job is generated for the print data of the record which extends over a plurality of pages as mentioned above.

If a variable length table in the record does not extend over a plurality of pages as determined at the step, a process of generating normal shift information is performed (S1203). Here, the shift information for shifting or not shifting the sheets of paper with the number of pages constituting the form is generated in order to alternately shift the sheets of paper for each record.

A process of writing the shift information into the print setup information file is then performed (S1205).

FIG. 13 illustrates pieces of information which designates "shift on" or "shift off" in the print setup information file. This example shows the case where the first, second, and fourth records correspond to field data as shown in FIG. 5, and third record corresponds to field data as shown in FIGS. 6A and 6B.

A process of determining whether the read record is the last record (S1206) is then performed, and if it is not the last record as determined, then the same processes which start from the process of reading field data of one record (S1201) will be repeated. Therefore, the analyses are made for all the records, and the print information setup file is generated.

In such a manner as described above, the process of shifting the paper exit position of the business form in the same direction for each record is achieved.

The shift information is set to the DEVMODE based on the similar sequence to that of the first embodiment, and sent to the printer (print device) for each page.

In the printing of the business form including a variable length page, even if there is a record which is printed over a plurality of pages, a setup can be performed to shift each page position to the same position for all the pages which are to be printed by the record by performing the above mentioned processes.

Third Embodiment

Furthermore, in the printing of a business form including a variable length page, the type of printer paper may be set by a print device while taking into account the record which will extend over a plurality of pages. For example, if a printer has a plurality of printer paper cassettes, sheets of paper having different color than normal one are stacked on one cassette, which is referred to as the special cassette. Furthermore, if the read record corresponds to the business form which extends over a plurality of pages, then an indication meaning that the special cassette is used to supply the sheets of printing paper is written in the print information setup file. Even in the case of printing of a plurality of records, any record which extends over a plurality of pages can be easily found from printed matter by performing such processes.

In addition, other print conditions including a printer paper size and a layout method (two-page printing etc.) may be changed depending on the number of output sheets for the record.

Other Embodiments

In addition, the present invention may be applied to a system consisting of a plurality of devices (for example, a host computer, an interface device, a reader, a printer, and the like), or applied to equipment consisting of a single device (a copier, a printer, a facsimile, or the like).

Further, the object of the present invention can be achieved by utilizing storage media for storing software program codes in which the functionality of the embodiments mentioned above is realized, and can be achieved by reading and executing the program codes stored on the storage media using a computer (or CPU or MPU) of a system or device.

In this case, the program codes themselves which are read from the storage media will provide the functionality of the embodiment mentioned above, and therefore the storage media having the program codes stored thereon will constitute the present invention.

As the storage media for providing program codes, for example, floppy(R) disks, hard disks, optical disks, magneto-optical disks, CD-ROMs, CD-Rs, magnetic tapes, nonvolatile memory cards, ROMs, and the like may be utilized.

Furthermore, the present invention includes the case, in which, after the program codes read from the storage media are written in a memory provided on an extended functional board inserted into a computer or an extended functional unit connected to a computer, a CPU or the like provided on the extended functional board or extended functional unit performs part or all of the actual processes based on the directions of the program codes, and therefore the functionality of the embodiments mentioned above is realized by these processes.

As many apparently widely different embodiments of the present invention can be made without departing from the spirit and scope thereof, it is to be understood that the invention is not limited to the specific embodiments thereof except as defined in the appended claims.

In accordance with the present invention, even if the field diagram includes variable length data and the number of output pages is different from record to record, a grouping (separation) for each record can be easily recognized based on stapling of output sheets together for each record.

Furthermore, since a shift setup can be made for each record, even if the field diagram includes a variable length data and the number of output pages is different from record to record, the same effect can be achieved based on the shifting.

This application claims priority from Japanese Patent Application No. 2003-400746 filed Nov. 28, 2003, which is hereby incorporated by reference herein.

What is claimed is:

1. A print control apparatus which generates output data by using (a) record data including field data and (b) form data including a field in which the field data is input, the print control apparatus comprising:

a determination unit configured to determine whether an output result satisfies a predetermined condition for a number of output pages, wherein the output result is obtained by inputting the field data included in a single record data in the field;

a generation unit configured to generate the output data such that when said determination unit determines that the output result satisfies the predetermined condition, a printing apparatus performs on the single record data a first processing provided for a case that matches the predetermined condition, and to generate the output data such that when said determination unit determines that the output result does not satisfy the predetermined condition, the printing apparatus performs on the single record data a second processing provided for a case that does not match the predetermined condition; and an output unit configured to output the output data generated by said generation unit to the printing apparatus.

2. The print control apparatus according to claim 1, wherein said determination unit determines whether the output result extends over a plurality of pages, and wherein said generation unit generates the output data such that when said determination unit determines that the output result extends over a plurality of pages, the printing apparatus performs the first processing by executing a stapling process on the single record data, and generates the output data such that when said determination unit determines that the output result does not extend over a plurality of pages, the printing apparatus performs the second processing by not executing a stapling process on the single record data.

3. The print control apparatus according to claim 1, wherein said determination unit determines whether the output result extends over a plurality of pages, and wherein said generation unit generates the output data such that when said determination unit determines that the output result extends over a plurality of pages, the printing apparatus outputs sheets of the plurality of pages formed based on the single record data to a same paper exit position.

4. The print control apparatus according to claim 1, further comprising a setting unit configured to set a first printing condition that matches the first processing performed by the printing apparatus or a second printing condition that matches the second processing performed by the printing apparatus, in accordance with a determination made by said determination unit.

5. A print control method executed by a computer with a print control apparatus which generates output data by using (a) record data including field data and (b) form data including a field in which the field data is input, the method comprising the steps of:

determining whether an output result satisfies a predetermined condition for a number of output pages, wherein the output result is obtained by inputting the field data included in a single record data in the field;

generating the output data such that when said determining step determines that the output result satisfies the predetermined condition, a printing apparatus performs on the single record data a first processing provided for a case that matches the predetermined condition, and generating the output data such that when said determining step determines that the output result does not satisfy the predetermined condition, the printing apparatus performs on the single record data a second processing provided for a case that does not match the predetermined condition; and outputting the output data generated in said generating step to the printing apparatus.

6. The method according to claim 5, wherein the determining step determines whether the output result extends over a plurality of pages, and wherein said generating step generates the output data such that when said determining step determines that the output result extends over a plurality of pages, the printing step performs the first processing by executing a stapling process on the single record data, and generates the output data such that when said determining step determines that the output result does not extend over a plurality of pages, the printing apparatus performs the second processing by not executing a stapling process on the single record data.

7. The method according to claim 5, wherein the determining step determines whether the output result extends over a plurality of pages, and wherein said generating step generates the output data such that when said determining step determines that the output result extends over a plurality of pages, the printing apparatus outputs sheets of the plurality of pages formed based on the single record data to a same paper exit position.

8. The method according to claim 5, further comprising a setting step of setting a first printing condition that matches the first processing performed by the printing apparatus or a second printing condition that matches the second processing performed by the printing apparatus, in accordance with a determination made in said determining step.

9. A computer-readable medium storing a computer program for a print control apparatus which generates output data by using (a) record data including field data and (b) form data including a field in which the field data is input, the print control program comprising the steps of:

determining whether an output result satisfies a predetermined condition for a number of output pages, wherein the output result is obtained by inputting the field data included in a single record data in the field;

generating the output data such that when said determining step determines that the output result satisfies the predetermined condition, a printing apparatus performs on the single record data a first processing provided for a case that matches the predetermined condition, and generating the output data such that when said determining step determines that the output result does not satisfy the predetermined condition, the printing apparatus performs on the single record data a second processing provided for a case that does not match the predetermined condition; and outputting the output data generated in said generating step to the printing apparatus.

10. The computer-readable storage medium storing a computer program according to claim 9, wherein the determining step determines whether the output result extends over a plurality of pages, and wherein the printing step performs the first processing by executing a stapling process on the single record data, and generates the output data such that when said determination step determines that the output result does not extend over a plurality of pages, the printing apparatus performs the second processing by not executing a stapling process on the single record data.

11. The computer-readable storage medium storing a computer program according to claim 9, wherein the determining step determines whether the output result extends over a plurality of pages, and wherein said generating step generates the output data such that when said determining step determines that the output result extends over a plurality of pages, the printing apparatus outputs sheets of the plurality of pages formed based on the single record data to a same paper exit position.

12. The computer-readable storage medium storing a computer program according to claim 9, further comprising a setting step configured to set a first printing condition that matches the first processing performed by the printing apparatus or a second printing condition that matches the second processing performed by the printing apparatus, in accordance with a determination made in said determinating step.

\* \* \* \* \*